US006974486B1

(12) United States Patent
Kweon et al.

(10) Patent No.: US 6,974,486 B1
(45) Date of Patent: *Dec. 13, 2005

(54) POSITIVE ACTIVE MATERIAL FOR RECHARGEABLE LITHIUM BATTERY AND METHOD OF PREPARING SAME

(75) Inventors: Ho-Jin Kweon, Cheonan-si (KR); Geun-Bae Kim, Cheonan-si (KR); Dong-Gon Park, Seoul (KR); Hyung-Gon Noh, Cheonan-si (KR)

(73) Assignee: Samsung SDI Co., Ltd., Kyungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/429,262

(22) Filed: Oct. 29, 1999

(30) Foreign Application Priority Data

Mar. 6, 1999 (KR) .................................. 1999-7430

(51) Int. Cl.$^7$ .......................... H01M 4/50; H01M 4/52
(52) U.S. Cl. ................. 29/623.1; 429/224; 429/231.1; 429/231.3; 429/231.5; 429/231.6; 29/623.5
(58) Field of Search .......................... 29/623.1, 623.5; 429/224, 231.9, 218.1, 215, 231.1, 231.3, 429/231.5, 231.6

(56) References Cited

U.S. PATENT DOCUMENTS

| | | | | | |
|---|---|---|---|---|---|
| 5,180,574 | A | * | 1/1993 | Von Sacken | 423/594 |
| 5,674,645 | A | * | 10/1997 | Amatucci et al. | 429/224 |
| 5,759,720 | A | * | 6/1998 | Amatucci et al. | 429/224 |
| 5,783,328 | A | * | 7/1998 | Wang | 429/137 |
| 5,869,208 | A | * | 2/1999 | Miyasaka | 429/224 |
| 5,882,821 | A | * | 3/1999 | Miyasaka | 429/224 |
| 5,932,374 | A | * | 8/1999 | Amatucci et al. | 429/224 |
| 6,004,695 | A | * | 12/1999 | Goda et al. | 429/218.1 |
| 6,040,087 | A | * | 3/2000 | Kawakami | 429/218.1 |
| 6,132,639 | A | * | 10/2000 | Komatsu et al. | 252/182.1 |
| 6,153,334 | A | * | 11/2000 | Sakamoto et al. | 429/223 |
| 6,365,299 | B1 | * | 4/2002 | Miyaki et al. | 429/218.1 |
| 6,372,385 | B1 | * | 4/2002 | Kweon et al. | 429/231.95 |
| 6,416,902 | B1 | * | 7/2002 | Miyasaka | 429/223 |
| 6,428,766 | B1 | * | 8/2002 | Fujino et al. | 423/599 |
| 6,458,487 | B1 | * | 10/2002 | Takeuchi et al. | 429/224 |
| 6,783,890 | B2 | * | 8/2004 | Kweon et al. | 429/218.1 |
| 2002/0061444 | A1 | * | 5/2002 | Kweon et al. | 429/231.1 |

FOREIGN PATENT DOCUMENTS

| | | |
|---|---|---|
| EP | 0 789 410 A1 | 8/1997 |
| JP | 62-119867 | 6/1987 |
| JP | 09-293508 | 11/1997 |
| WO | WO99/05734 | * 2/1999 |

OTHER PUBLICATIONS

Hawley's Condensed Chemcial Dictionary, 11th ed., pp. 35 and 1039. no month, 1987.*

* cited by examiner

*Primary Examiner*—Tracy Dove
(74) *Attorney, Agent, or Firm*—Blakely, Sokoloff, Taylor & Zafman

(57) ABSTRACT

A positive active material for rechargeable lithium batteries includes an active material component processed from a manganese-based compound. The transition metal compound is selected from $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, or $Li_xMn_{2-y}M_yO_{4-z}S_z$ where $0<x\leq1.5$, $0.05\leq y\leq 0.3$, $z\leq 1.0$ and M is selected from Al, Co, Cr, Mg, Fe or La. A metallic oxide is coated on the active material component.

3 Claims, 3 Drawing Sheets

POSITIVE ACTIVE MATERIAL FOR RECHARGEABLE LITHIUM BATTERY AND METHOD OF PREPARING SAME

BACKGROUND OF THE INVENTION (a) Field of the Invention

The present invention relates to a positive active material for rechargeable lithium batteries and a method of preparing the same and, more particularly, to a manganese-based positive active material for rechargeable lithium batteries which has a good cycle life characteristic.

(b) Description of the Related Art

Generally, manganese-based compounds such as $LiMn_2O_4$ and $LiMnO_2$ are the positive active material of choice for rechargeable lithium batteries because of their low cost, abundance and environmentally friendly characteristics. Among such manganese-based compounds, $LiMn_2O_4$ is particularly stable for the battery use and thus attractive for the electric vehicle application.

However, as compared to other lithiated transition metal oxides such as $LiCoO_2$ and $LiNiO_2$, $LiMn_2O_4$ has a relatively low discharge capacity. Furthermore, when high rate of charge and discharge operations are cycled, the discharge capacity is excessively reduced. In particular, when the charge and discharge operations are continuously performed at high temperatures, manganese distributed in the surface of $LiMn_2O_4$ readily elutes to the electrolyte, causing a disproportionation reaction. This reaction seriously deteriorates the cycle life characteristic of the battery.

SUMMARY OF THE INVENTION

It is an object of the present invention to provide a manganese-based positive active material for rechargeable lithium batteries which exhibits a good cycle life characteristic at high temperatures.

This and other objects may be achieved by a positive active material for rechargeable lithium batteries including an active material component processed from a manganese-based compound. The manganese-based compound is selected from $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, or $Li_xMn_{2-y}M_yO_{4-z}S_z$ where $0<x \leq 1.5$, $0.05 \leq y \leq 0.3$, $z \leq 1.0$ and M is selected from Al, Co, Cr, Mg, Fe or La. A metallic oxide is coated on the active material component.

A method of preparing the positive active material is performed by obtaining a powder from a source material. The source material is selected from $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, or $Li_xMn_{2-y}M_yO_{4-z}S_z$, where $0<x \leq 1.5$, $0.05 \leq y \leq 0.3$, $z \leq 1.0$ and M is selected from Al, Co, Cr, Mg, Fe or La. The powder is then coated with a metallic alkoxide solution to make an alkoxide-coated powder. Thereafter, the metallic alkoxide-coated powder is heat-treated such that it is changed into a metallic oxide-coated powder.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
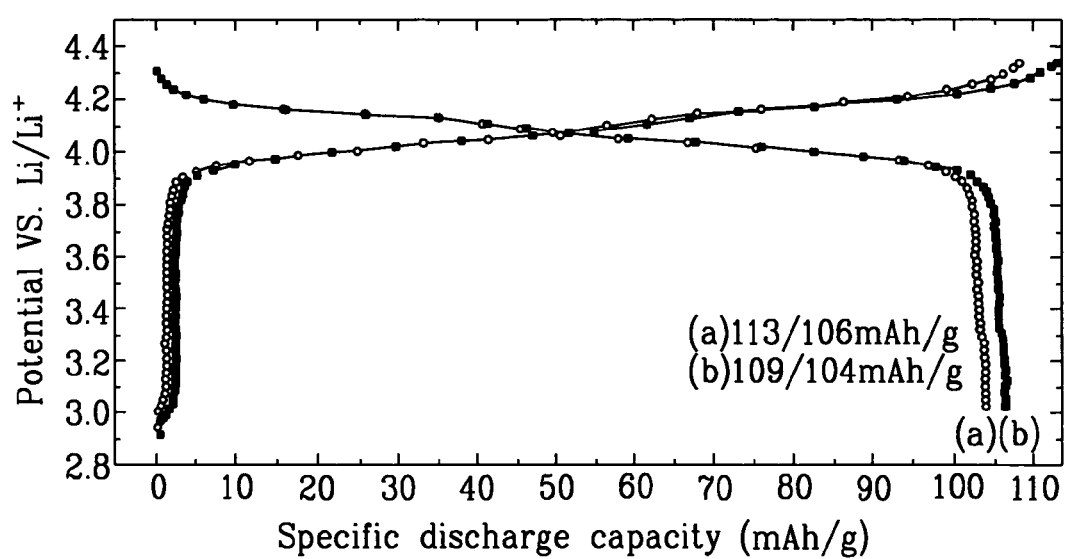
FIG. 1 is a graph illustrating high-temperature charge and discharge characteristics of rechargeable lithium cells according to an example of the present invention and a comparative example.

In a method of preparing a positive active material for rechargeable lithium batteries, a powder, being an active material precursor, is first processed from a manganese-based compound. The manganese-based compound is selected from $Li_xMnO_2$, $Li_xMnF_2$, $Li_xMnS_2$, $Li_xMnO_{2-z}F_z$, $Li_xMnO_{2-z}S_z$, $Li_xMn_{1-y}M_yO_2$, $Li_xMn_{1-y}M_yF_2$, $Li_xMn_{1-y}M_yS_2$, $Li_xMn_{1-y}M_yO_{2-z}F_z$, $Li_xMn_{1-y}M_yO_{2-z}S_z$, $Li_xMn_2O_4$, $Li_xMn_2F_4$, $Li_xMn_2S_4$, $Li_xMn_2O_{4-z}F_z$, $Li_xMn_2O_{4-z}S_z$, $Li_xMn_{2-y}M_yO_4$, $Li_xMn_{2-y}M_yF_4$, $Li_xMn_{2-y}M_yS_4$, $Li_xMn_{2-y}M_yO_{4-z}F_z$, or $Li_xMn_{2-y}M_yO_{4-z}S_z$, where $0<x \leq 1.5$, $0.05 \leq y \leq 0.3$, $z \leq 1.0$ and M is selected from Al, Co, Cr, Mg, Fe or La. The powder processing step can be performed with a technique known in the related art.

Thereafter, the powder is coated with an alkoxide solution. The alkoxide solution is formed by the reaction of an alcohol with a metal being 1 to 50 weight percent of the alcohol. The metal may be preferably selected from Mg, Al, Co, K, Na, Ca, Ti or Sr. More preferably, the metal is selected from Mg, Ti or Al. An alternative alkoxide is a silicon alkoxide formed by a reaction of an alcohol with silicon. The alcohol is preferably selected from methanol or ethanol. When the metal or silicon is less than 1 weight percent of the alcohol, the coating effect of the metallic alkoxide solution onto the powder is not induced. In contrast, when the metal or silicon is more than 50 weight percent of the alcohol, the coating layer of the metallic alkoxide solution becomes undesirably thick. A sputtering technique, a chemical vapor deposition (CVD) technique, a dip coating technique and other general-purpose coating techniques may be employed for the coating use. Among the techniques, the dip coating technique may be preferably used for coating the alkoxide solution onto the powder.

The alkoxide-coated powder is then dried at 120° C. for about 5 hours in an oven. The drying step is to uniformly distribute lithium salts in the powder. Thereafter, the dried powder is heat-treated at temperatures ranged from 200 to 1000° C. for 1 to 20 hours under an oxidation atmosphere where dry air or oxygen is blowing. When the heat-treating temperature is lower than 200° C., the metallic or silicon alkoxide solution coated on the powder is not crystallized so that it prohibits free movement of lithium ions in the active material. It is preferable that the heat-treating step is performed at temperatures ranged from 300 to 900° C. for 1 to 10 hours. This heat-treating operation makes the metallic or silicon alkoxide to be changed into an oxide. In this way, a metallic or silicon oxide-coated active material is prepared.

The metallic or silicon oxide formed on the surface of the power may be derived from the single metallic or silicon alkoxide source or the composite sources of manganese of lithiated transition metal compound and metallic alkoxide. The thickness of the metallic oxide layer reaches up to 1 to 100 nm and the quantity of metal content is ranged from 1.0 to 10 weight percent of the metallic oxide.

The following examples further illustrate the present invention.

EXAMPLE 1

An aluminum isopropoxide solution having a 5 weight-percent concentration was prepared by refluxing an aluminum isopropoxide powder in ethanol at about 100° C. for about half an hour. The aluminum isopropoxide solution was then mixed with a powder of $Li_xMn_{2-y}Al_yO_{4-z}F_z$ where $0<x\leq1.5$, $0.05\leq y\leq0.3$ and $z\leq1.0$ at an identical volume ratio in a moisture free dry room such that an overall surface of the power became wet sufficiently by the solution, and dried in the same room. Thereafter, the mixture was heat-treated at about 300° C. for about 10 hours under a dry air atmosphere to thereby prepare a metallic oxide-coated active material. Then, the active material was mixed with Super P carbon for a conductive agent, KF-1300 polyvinylidene fluoride for a binder and N-methylpyrrolidone for a solvent to prepare an active material slurry. The slurry is cast into a tape shape to act as a positive electrode. The positive electrode is then assembled with a lithium metal foil for an opposite pole by using a lithium salt solution for an electrolyte to thereby fabricate a coin cell-type half cell. The lithium salt solution contained 1:1 volume ratio of ethylene carbonate and dimethyl carbonate for a solvent and $LiPF_6$ for a solute.

EXAMPLE 2

The positive electrode preparing procedure was performed in the same way as in Example 1 with the exception that the heat-treating temperature was heightened up to 900° C. A coin-type half cell was fabricated with the resulting positive electrode in combination with other components as described in Example 1.

EXAMPLE 3

An aluminum isopropoxide solution have a 5 weight-percent concentration was prepared by refluxing an aluminum isopropoxide powder in ethanol at about 100° C. for about half an hour. The aluminum isopropoxide solution was then mixed with a powder of $Li_xMn_2O_4$ where $0<x\leq1.5$ at an identical volume ratio in a moisture free dry room such that an overall surface of the power became wet sufficiently by the solution, and dried in the same room. Thereafter, the mixture was heat-treated at about 300° C. for about 10 hours under a dry air atmosphere to thereby prepare a metallic oxide-coated active material. The subsequent positive electrode processing steps were performed in the same way as in Example 1. A coin-type half cell was fabricated with the resulting positive electrode in combination with other components as described in Example 1.

COMPARATIVE EXAMPLE 1

The positive electrode preparing procedure was performed in the same way as in Example 1 with the exception that $Li_xMn_{2-y}Al_yO_{4-z}F_z$ was directly used for the active material without the metallic-alkoxide coating operation. A coin-type half cell was fabricated with the resulting positive electrode in combination with other components as described in Example 1.

Figure 2:
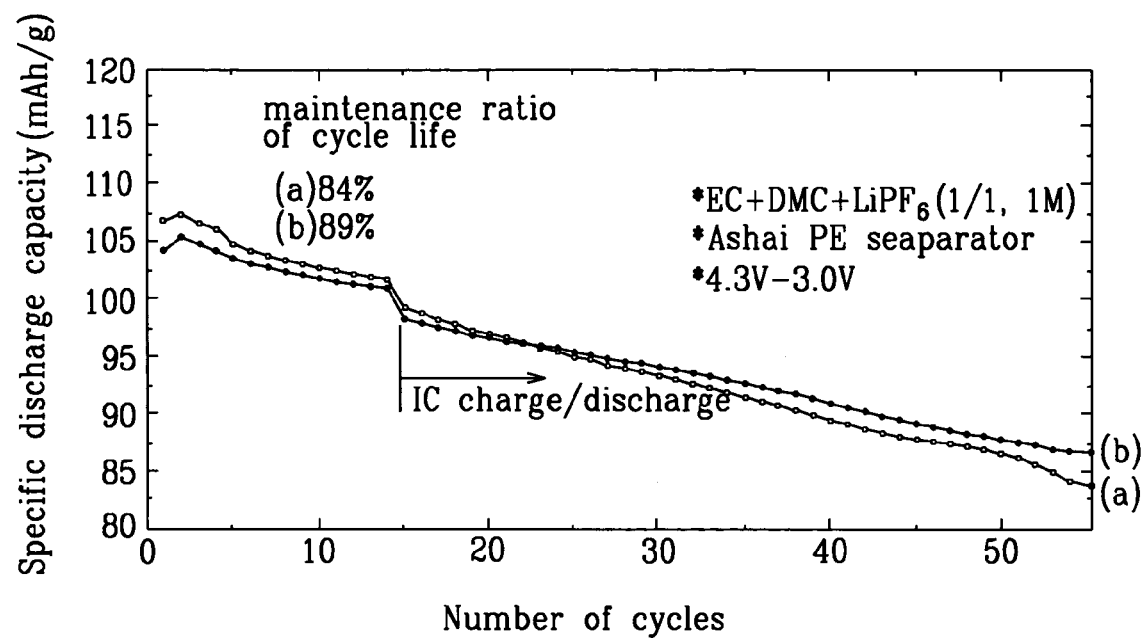
FIG. 2 is a graph illustrating high-temperature cycle life characteristics of the rechargeable lithium cells of FIG. 1.

The coin type cells fabricated according to Example 1 and Comparative Example 1 were charged and discharged at 50° C. from 0.1 C to 1 C rate over the voltage window between 4.3 V and 3.0 V. The charge and discharge characteristics of the cells in the early cycles were illustrated in FIG. 1. Further, the cycle life characteristics of the cells were illustrated in FIG. 2. In each of the figures, the charge and discharge characteristic of the cell according to Example 1 is indicated by a parenthesized alphabetic symbol "(a)" and that of the cell according to Comparative Example 1 is indicated by another symbol "(b)". As shown in FIGS. 1 and 2, the cell according to Example 1 exhibited a slightly lower specific capacity but a better cycle life characteristic at high temperatures than the cell according to Comparative Example 1. It is presumed that the good cycle life characteristic of the cell is resulted because the metallic oxide layer coated on the surface of the manganese-based active material component prevents elution of manganese to the electrolyte. The cells fabricated according to Examples 2 and 3 also exhibited the desired performance characteristic similar to that of Example 1.

Figure 3:
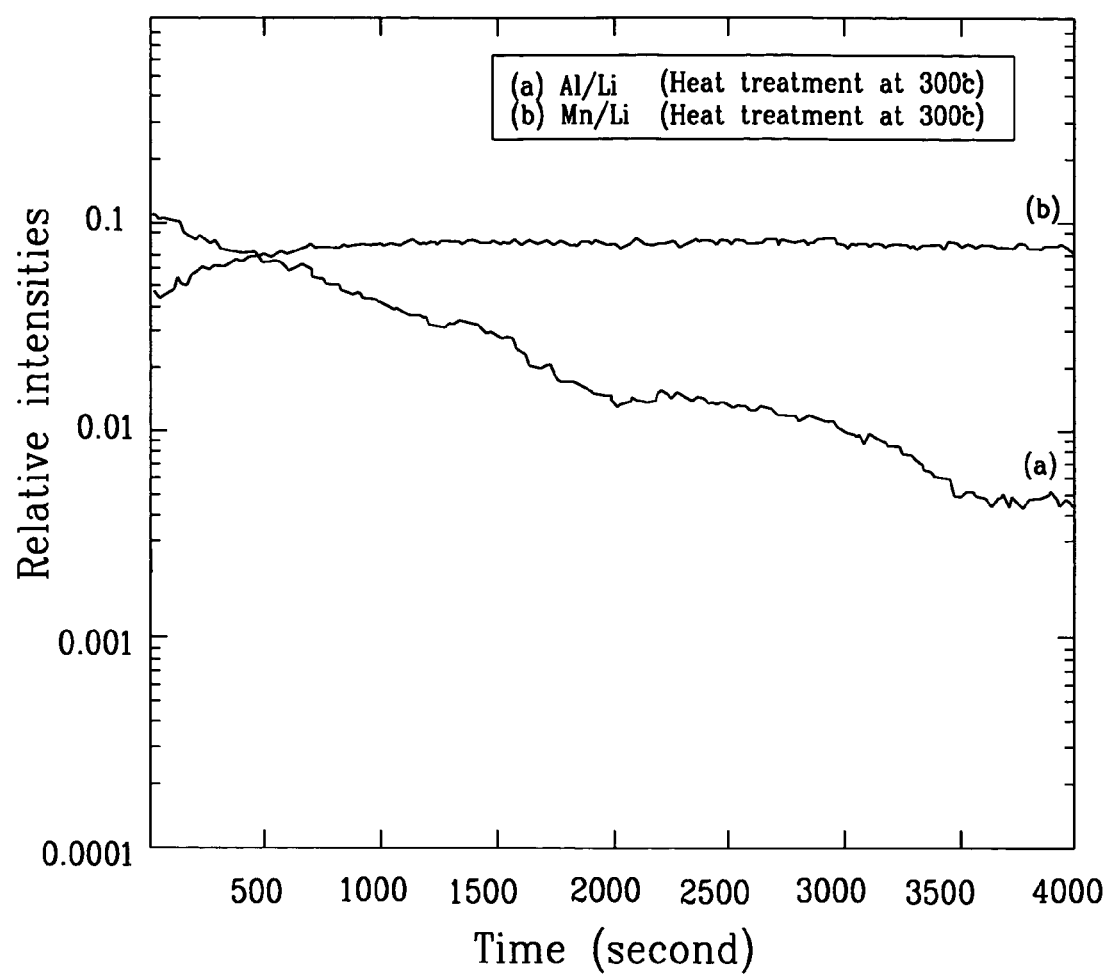
FIG. 3 is a graph illustrating SIMS analysis results with respect to a rechargeable lithium cell according to another example of the present invention.

Meanwhile, a secondary ion mass spectrometry (SIMS) analysis was performed with respect to the positive active material prepared according to Example 3 to measure the component distribution ratio. The result was illustrated in FIG. 3. In the figure, the relative intensity of the aluminum component is indicated by a parenthesized alphabetic symbol "(a)" and that of the manganese component is indicated by another symbol "(b)". As shown in FIG. 3, it could be known that the aluminum component existed more in the surface portion of the active material and the manganese component existed more in the center portion of the active material. This proved that the overall surface of $Li_xMn_2O_4$ was completely coated with aluminum oxide.

As described above, the positive active material for rechargeable lithium batteries has a good high-temperature cycle life characteristic.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method of preparing a positive active material for rechargeable lithium batteries, the method comprising the steps of:

obtaining a powder from a source material, the source material being selected from the group consisting of $Li_xMnO_2$, $Li_xMn_{1-y}M_yO_2$, $Li_xMn_{1-y}M_yO_{2-z}F_z$, $Li_xMn_{1-y}$ $M_yO_{2-z}S_z$, $Li_xMn_2O_4$, $Li_xMn_{2-y}M_yO_4$, $Li_xMn_{2-y}M_yO_{4-z}$ $F_z$, and $Li_xMn_{2-y}M_yO_{4-z}S_z$, where $0<x<1.5$, $0.05\leq y\leq0.3$, $z\leq1.0$ and M is selected from the group consisting of Al, Co, Cr, Mg, Fe and La; and coating the powder with a metallic alkoxide solution to make an alkoxide-coated powder, the metallic alkoxide solution being selected from the group consisting of Mg-Alkoxide and Al-alkoxide; and heat-treating the alkoxide-coated powder such that the alkoxide-coated powder is changed into an oxide-coated powder.

2. The method of claim 1 wherein the alkoxide solution contains 1 to 50 weight percent of the metal.

3. The method of claim 1 wherein the heat-treating step is performed at a temperature range of 200 to 1000° C. for 1 to 20 hours.

* * * * *